United States Patent [19]

Naraoka et al.

[11] Patent Number: 5,455,809
[45] Date of Patent: Oct. 3, 1995

[54] DISK APPARATUS HAVING MAGNETIC HEAD FOR MAGNETO-OPTICAL RECORDING DEVICE

[75] Inventors: Koji Naraoka, Saitama; Masami Horita, Tokyo, both of Japan

[73] Assignee: TEAC Corporation, Japan

[21] Appl. No.: 242,184

[22] Filed: May 13, 1994

[30] Foreign Application Priority Data

May 17, 1993 [JP] Japan ................................. 5-114742

[51] Int. Cl.⁶ .................................................. G11B 13/04
[52] U.S. Cl. .................................................. 369/13; 360/114
[58] Field of Search .............................. 369/13, 14, 75.1, 369/75.2, 77.1, 77.2, 78; 360/114, 59, 105, 104, 109; 365/122

[56] References Cited

U.S. PATENT DOCUMENTS

| | | | |
|---|---|---|---|
| 5,122,998 | 6/1992 | Mizuno et al. | 369/13 |
| 5,237,475 | 8/1993 | Kazama et al. | 369/13 |
| 5,268,882 | 12/1993 | Mukawa | 369/13 |

FOREIGN PATENT DOCUMENTS

| | | | |
|---|---|---|---|
| 387047 | 9/1990 | European Pat. Off. | 369/13 |
| 3-19160 | 1/1991 | Japan . | |
| 3-19159 | 1/1991 | Japan . | |
| 3-104068 | 5/1991 | Japan . | |
| 5182274 | 7/1993 | Japan | 369/13 |
| 5274739 | 10/1993 | Japan | 369/13 |
| 64929 | 1/1994 | Japan | 369/13 |

Primary Examiner—Georgia Y. Epps
Assistant Examiner—Tan Dinh
Attorney, Agent, or Firm—Andrus, Sceales, Starke & Sawall

[57] ABSTRACT

An magneto-optical disk apparatus has a magnetic head assembly a magnetic head slider loading mechanism. The magnetic head assembly has a magnetic head slider and a support arm for supporting the magnetic head slider. The magnetic head slider loading mechanism is fixed to a first yoke member 25 at the base of the support arm, to a generally U-shaped second yoke member fixed to a head carriage, and to a first towering part of the second yoke member. The magnetic head slider loading mechanism has a blade spring which has the first yoke member 25 fixed to the end of the blade spring, a coil provided in the first towering part, and a permanent magnet piece fixed to a second towering part. The magnetic force generated by the energization of the coil and the magnetic force of the permanent magnet piece causes the first yoke member to be magnetically attracted and attached to the second towering part so that the magnetic head slider is loaded above the magneto-optical disk.

8 Claims, 7 Drawing Sheets

FIG. IC
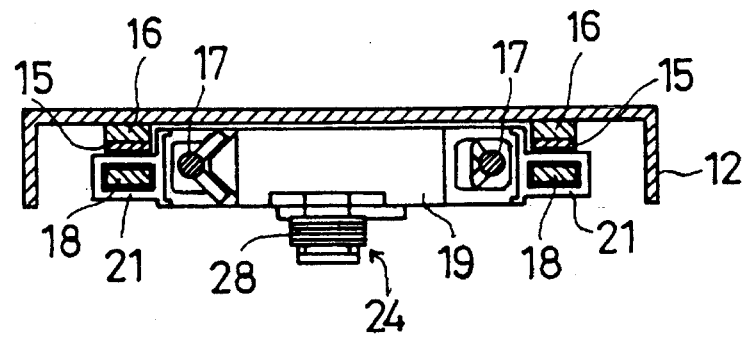
FIG. IA
11
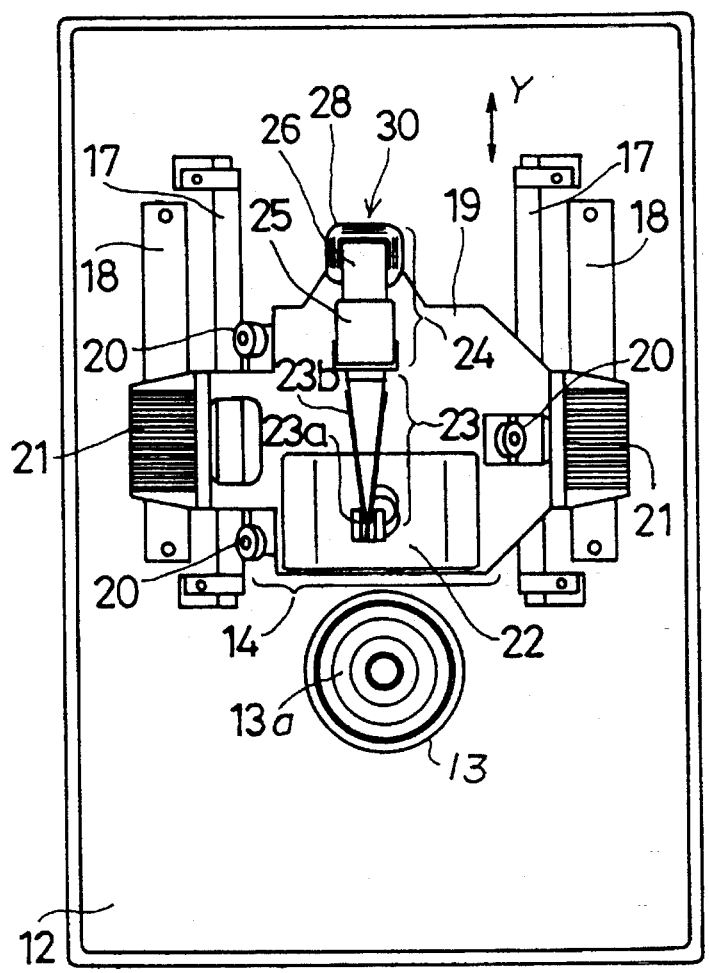
FIG. IB
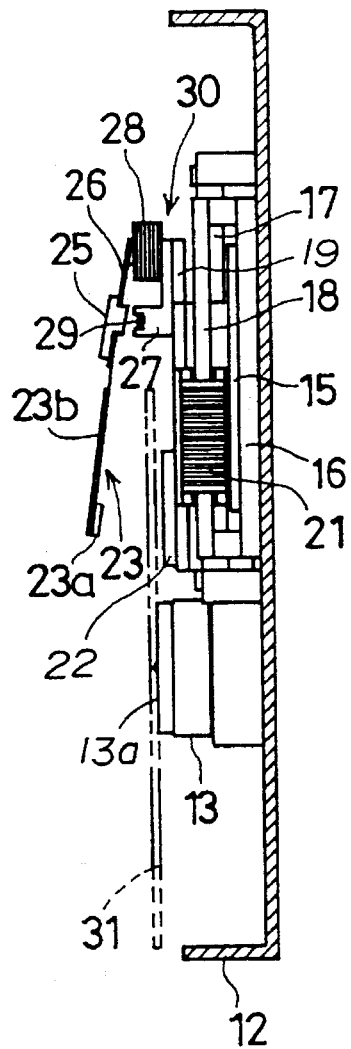

DISK APPARATUS HAVING MAGNETIC HEAD FOR MAGNETO-OPTICAL RECORDING DEVICE

BACKGROUND OF THE INVENTION

The present invention relates to magneto-optical disk apparatuses, and more particularly to a magneto-optical disk apparatus which operates according to a magnetic field modulation and has a magnetic head loading mechanism.

Laser power modulation, which is employed in earlier types of magneto-optic disk apparatuses, is characterized by a slow data transmission speed during the recording since this modulation system does not have overwrite capability.

Accordingly, a magnetic field modulation is now used as a recording system capable of performing an overwrite operation easily.

A floating magnetic head slider system used in a magnetic disk apparatus of a hard disk has advantages of high-density recording and low power consumption and is proposed as a magnetic head to be used in the magnetic field modulation.

Unlike a magnetic disk apparatus, an interchangeable medium is used in a magneto-optical disk apparatus. Thus, there is a need for a magnetic head loading mechanism whereby the magnetic head is moved away from a disk and set again above the disk after the disk has been changed.

It is a convention in a magneto-optical disk apparatus to control an optical head with respect to light beam focus and with respect to tracking performance. A seek control whereby the entire movable part of the head is moved to a predetermined track is also performed. In order to execute these controls in a high-precision and stable manner, it is required that the movable part of the head be constructed to be light and highly rigid.

The Japanese Laid-Open Patent Applications No.3-19159, No.3-19160 and No.3-104068 propose disk apparatuses having a magnetic head loading mechanism.

In No.3-19159 and No.3-19160, a connecting member of an optical head is connected to a second elastic body. The second elastic body is connected to a first elastic body. A magnetic head is fitted to the end of the first elastic body. In an unloading operation, the first elastic body is thrust upward by a support rod or a vertically-moving rod so that the magnetic head is moved away from the disk. In a loading operation, the support rod or the vertically-moving rod is released so that the magnetic head is located above the disk.

No.3-104068 discloses a construction in which the back end of a load beam (support arm) which has a magnetic head attached to the end thereof is connected to a blade spring. In this construction, in a loading operation, an upper plate is slid on and restrains the blade spring so that the magnetic head is located above the disk.

However, the constructions as described in No.3-19159 and No.3-19160 have a problem in that since the magnetic head is supported by the first and second elastic bodies and is connected to the optical head, the rigidity of the movable part of the head is significantly small. Specifically, the magnetic head slider is maintained in a floating position, with a lift generated by an air flow resulting from the rotation of the disk being in balance with a pressure caused by the deflection of the first elastic body (load beam), and the load beam is supported by the second elastic body. In the event of a variation in the slider orientation or a vibration of the slider, which variation and vibration are caused as result of the acceleration of the head in a seek operation or as a result of an external vibration, an error may occur in a recording signal, or the head may clash against the disk.

While construction as described in No.3-104068 ensures that the rigidity of the movable part of the head is satisfactory, it has the following problems: the movable part of the head is relatively heavy and large; positional precision and stability of the head is relatively unsatisfactory; and power consumption during a seek operation is relatively large.

Another problem common to all of the three constructions described above is that, since the magnetic head loading mechanism is built in the movable part of the head or the frame part (fixed part), the mechanism occupies a relatively large space, with the result that an effort to make the apparatus small and thin so as to fit in small-scale electronic apparatuses is thwarted.

SUMMARY OF THE INVENTION

Accordingly, it is a general object of the present invention to provide an optical disk apparatus which is capable of high-speed access.

Another and more specific object of the present invention is to provide a magneto-optical disk apparatus comprising: a turntable on which a magneto-optical disk in a cartridge is mounted; an optical head assembly; a magnetic head assembly including a support arm and a magnetic head slider which, provided at the end of said support arm, is provided with a magnetic head for generating a recording magnetic field; a head carriage which supports said optical head assembly and said magnetic head assembly, and moves in the radial direction of said magneto-optical disk in a cartridge; and a magnetic head slider loading means for moving said magnetic head slider between a non-recording position removed from the surface of said magneto-optical disk in a cartridge and a recording position adjacent to said surface, wherein said magnetic head slider loading means comprises: an elastic member which, fixed on said head carriage, supports, at the end of said elastic member, the base of said support arm of said magnetic head assembly, and supports said magnetic head slider at said non-recording position by a spring force; and a magnetic attraction means which, provided in said head carriage, elastically deforms said elastic member and magnetically attracts and fixes the base of said support arm when a recording is performed so that said magnetic head slider can be fixed at said recording position.

According to the present invention, the rigidity of the part supporting the magnetic head slider can be increased in a recording mode of operation, since the base of the support arm is attracted and attached to a magnetic head slider loading mechanism in a recording mode. Thereby, accesses can be made speedily.

BRIEF DESCRIPTION OF THE DRAWINGS

Other objects and further features of the present invention will be apparent from the following detailed description when read in conjunction with the accompanying drawings, in which:

FIG. 1A is a top view of the magneto-optical disk apparatus according to an embodiment of the present invention, with an upper lid removed;

FIG. 1B is a longitudinal side view of the apparatus of FIG. 1A;

FIG. 1C is a longitudinal back view of the apparatus of FIG. 1A;

DESCRIPTION OF THE PREFERRED EMBODIMENT

Figure 2:
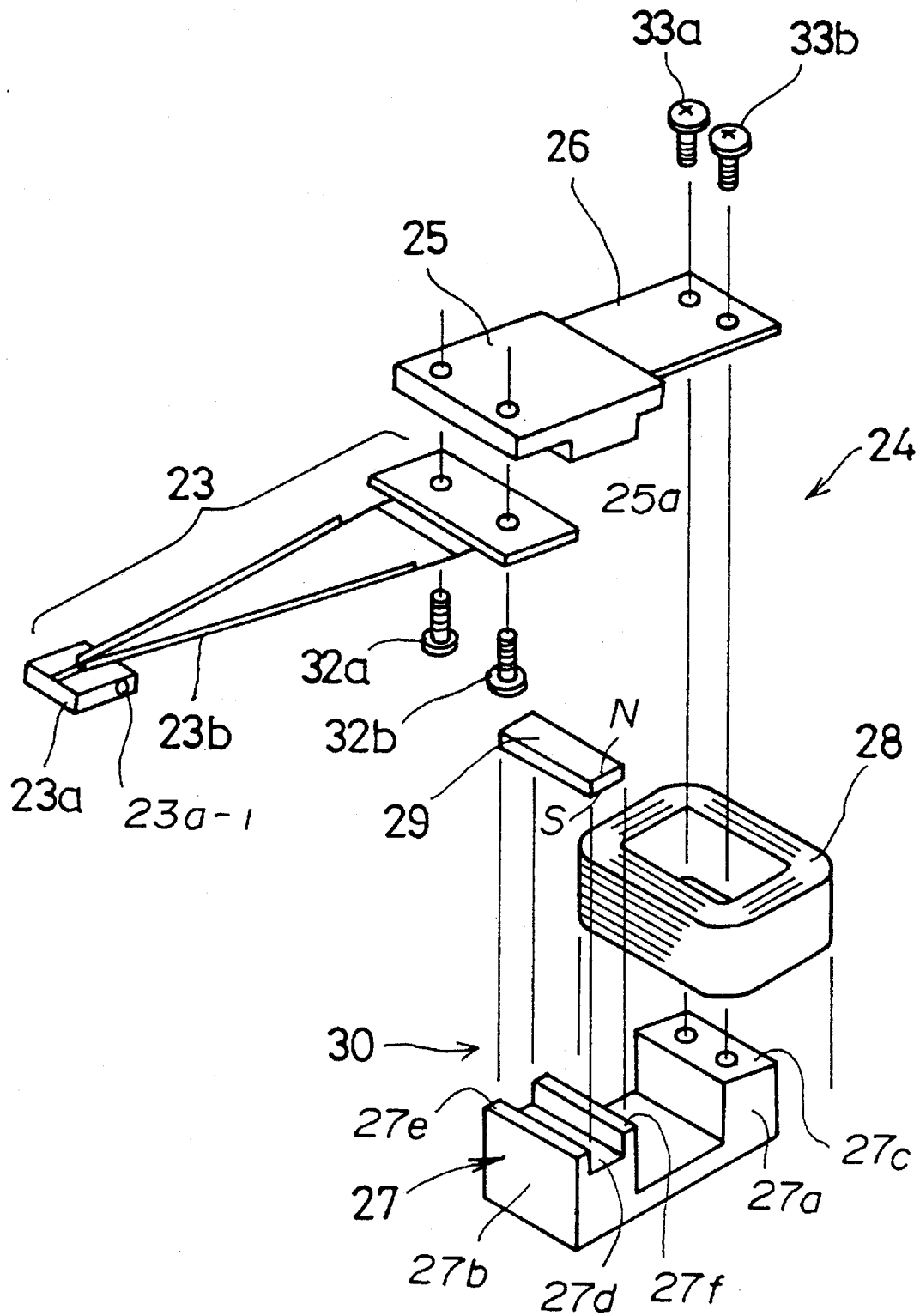
FIG. 2 is an exploded perspective view of a magnetic head slider assembly and a magnetic head slider loading mechanism of FIG. 1A.

A description will now be given, with reference to the drawings, of an embodiment of the present invention.

FIGS. 1A, 1B and 1C show a magneto-optical disk apparatus 11 according to an embodiment of the present invention.

The magneto-optical disk apparatus 11 is an apparatus which operates according to magnetic field modulation.

The magneto-optical disk apparatus 11 has a frame 12, and a spindle motor 13 and an optical head assembly 14 on the frame 12.

A pair of side yokes 16 each having a permanent magnet 15 attached thereto and a pair of guide rails 17 are provided in the frame 12 so as to lie in the direction that the optical head assembly 14 is moved. Further, a pair of core yokes 18 are provided opposite the permanent magnets 15.

The optical head assembly 14 has a head carriage 19.

The head carriage 19 is engaged with the pair of guide rails 17 on either side by means of a predetermined number of bearings 20, and is moved along the guide rails 17. A coil 21 is wound around each of the core yokes 18. An electromagnetic force is generated as a result of magnetic flux of a magnetic circuit and an applied current. This electromagnetic force causes the head carriage to move. The head carriage 19 has a recording/reproducing optical system built therein, and a lens actuator 22 is exposed in the upper part of the head carriage 19.

The head carriage 19 is provided with a magnetic head slider loading mechanism 24 and a magnetic head assembly 23.

As shown in FIG. 1C, a magneto-optical disk 31 is mounted on a turntable 13a rotated by the spindle motor 13.

The head carriage 19 is moved in the Y direction (the radial direction of the mounted magneto-optical disk 31) so that the head assembly 14 and the magnetic head assembly 23 are moved to access a desired track of the magneto-optical disk 31.

A description will now be given, with reference to FIG. 2 as well as the above mentioned figures, of the magnetic head assembly 23.

The magnetic head assembly 23 comprises: a magnetic head slider 23a provided with a magnetic head 23a formed of a magnetic core and a coil for generating a recording magnetic field; and a support arm (load beam) 23b which functions as a suspension for maintaining the magnetic head slider 23a in a floating position.

The base of the support arm 23b is screwed into a first yoke member 25 by vises 32a and 32b.

A description will now be given, also with reference to FIG. 2, of the magnetic head slider loading mechanism 24.

The magnetic head slider loading mechanism 24 has a blade spring 26 functioning as an elastic member, the first yoke member 25, a second yoke member 27, a coil 28 and a permanent magnet piece 29.

The second yoke member 27 is screwed into the topside of the head carriage 19.

The second yoke member 27 is generally U-shaped and has a first towering part 27a and a second towering part 27b on both sides thereof.

The first towering part 27a has a slanting top surface 27c.

The top of the towering part 27b has a depression 27d at the center thereof and has rib parts 27e and 27f on both sides.

The permanent magnet piece 29 has a dimension which allows it to be engaged with the depression 27d and is magnetized in the direction of the thickness of the piece.

The permanent magnet piece 29 is fitted into the depression 27d and fixed thereto. The upper surface of the permanent magnet piece 29 is on a slightly lower level than the upper surface of the rib parts 27e and 27f. The towering part 27b functions as a back yoke of the permanent magnet piece 29.

The permanent magnet piece 29 functions such that it is unnecessary to energize the coil 28 once the magnetic head slider is loaded above the magneto-optical disk.

The coil 28 is formed around the towering part 27a and is fixed to the second yoke member 27.

As described later, the coil 28 is energized only when the magnetic head slider is loaded or unloaded. The coil 28 is de-energized when information is to be recorded or reproduced after the magnetic head slider is loaded.

The second yoke member 27 and the coil 28 constitutes an electromagnet 30.

The base of the blade spring 26 is screwed into the top surface 27c of the towering part 27a by vises 33a and 33b.

Since the top surface 27c is slanting, the blade spring 26 faces diagonally upward.

The first yoke member 25 is adhesively attached or welded into the end of the blade spring 26.

The first yoke member 25 has a convex step portion 25a, which portion is opposite the towering part 27b of the second yoke member 27.

The first yoke member 25, the towering part 27b of the second yoke member 27, and the permanent magnet piece 29 function to hold the base of the support arm 23b in a fixed position when the loading of the magnetic head is completed and to increase the rigidity of the magnetic head assembly 23.

The magnetic head slider loading mechanism 24 and the magnetic head assembly 23 are integrated to form a composite body, thus ensuring that the magneto-optical disk apparatus 11 has a solid construction.

Figure 3A:
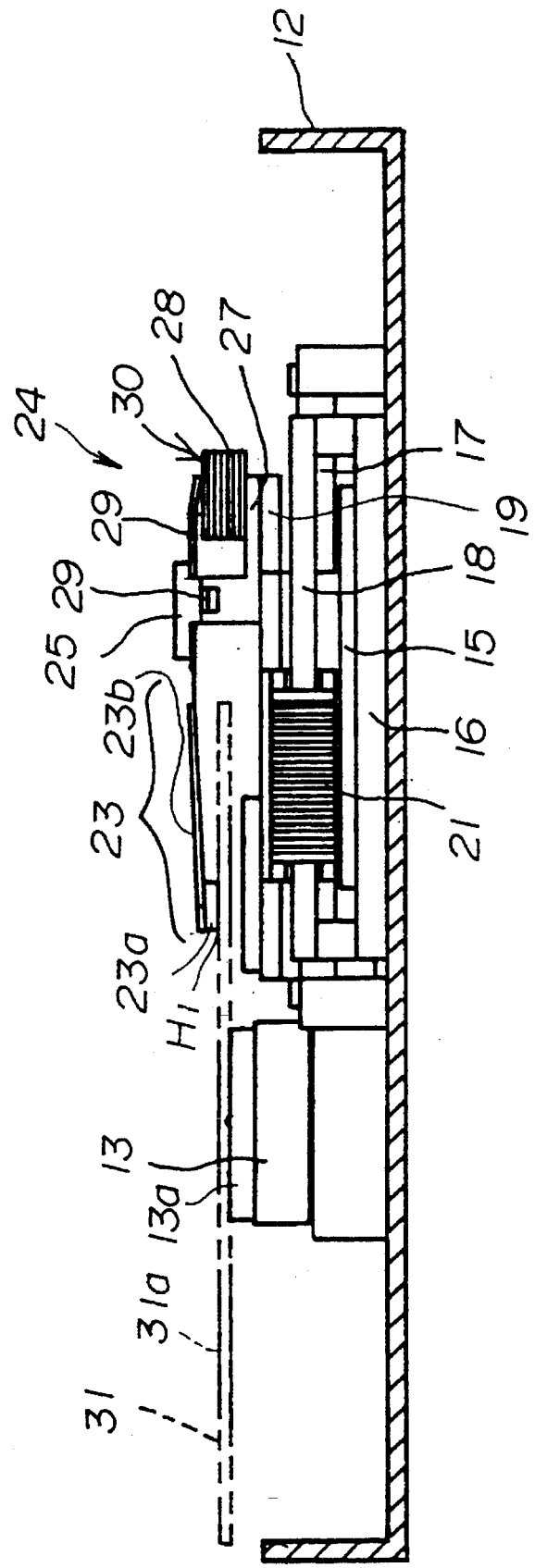
FIG. 3A is a view showing the magnetic head slider in a loaded state.

A description will now be given of the operation of the magnetic head slider loading mechanism 24 of the above construction. FIG. 3A shows the magnetic head slider in a loaded state, and FIG. 3B shows the magnetic head slider in an unloaded state.

Figure 3B:
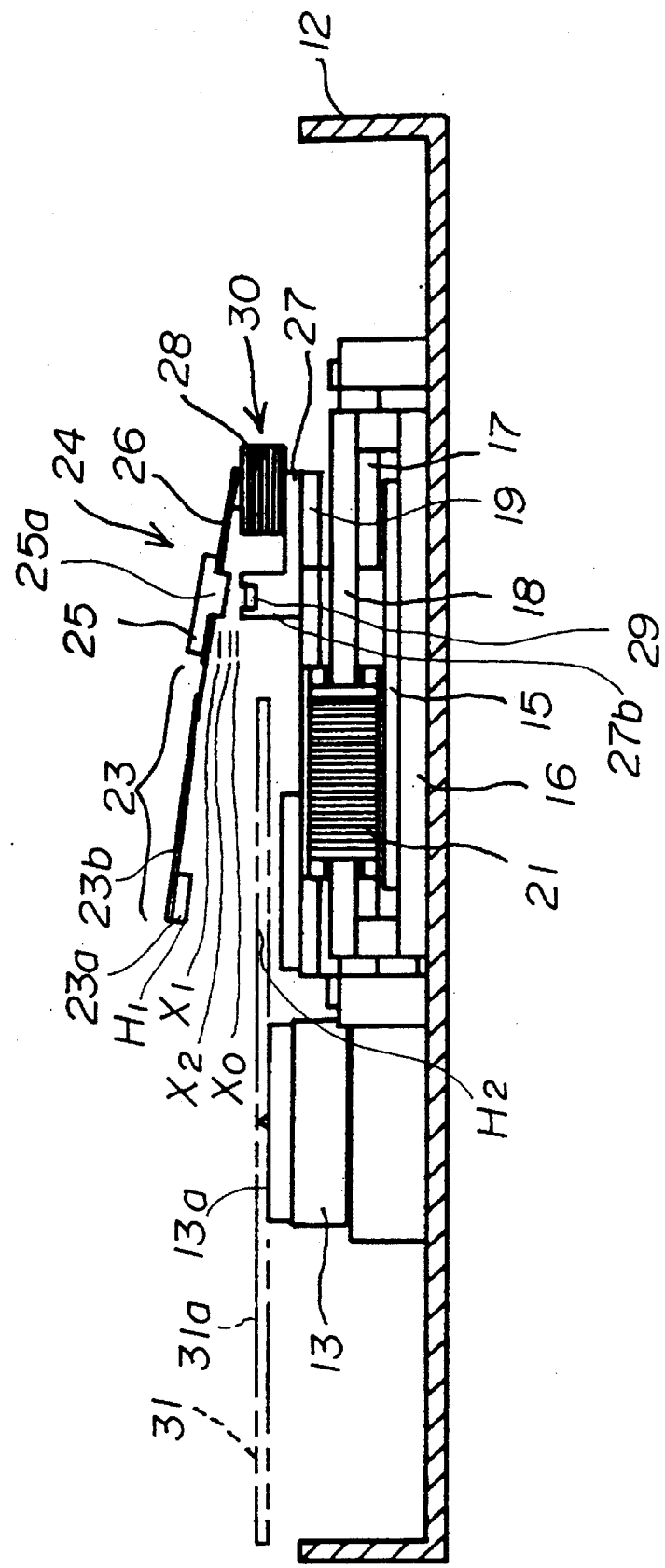
FIG. 3B is a view showing the magnetic head slider in an unloaded state.
Figure 4A:
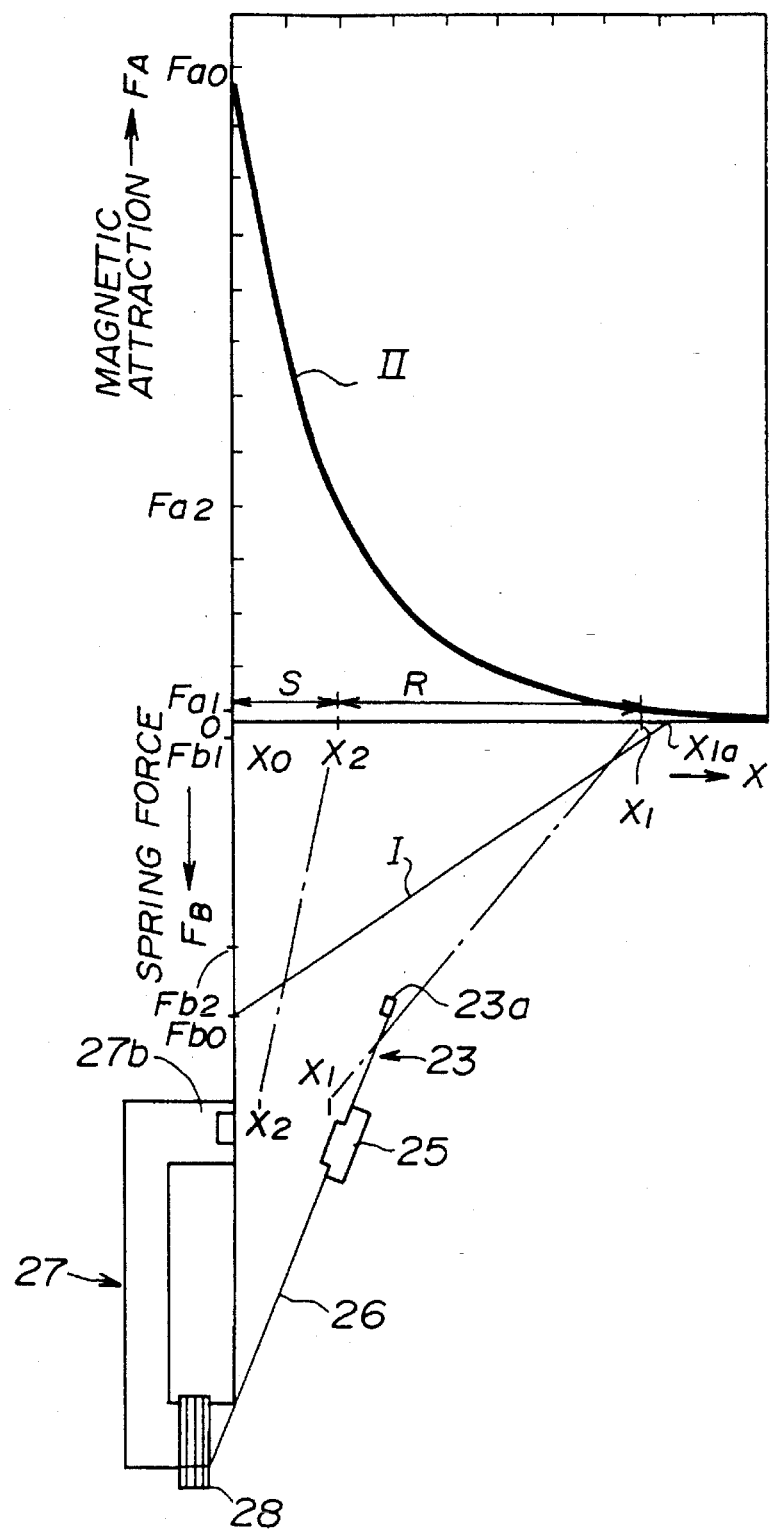
FIG. 4A is a graph showing the relationship between the position of a first yoke member and magnetic attraction/a spring force exerted on the first yoke member.
Figure 4B:
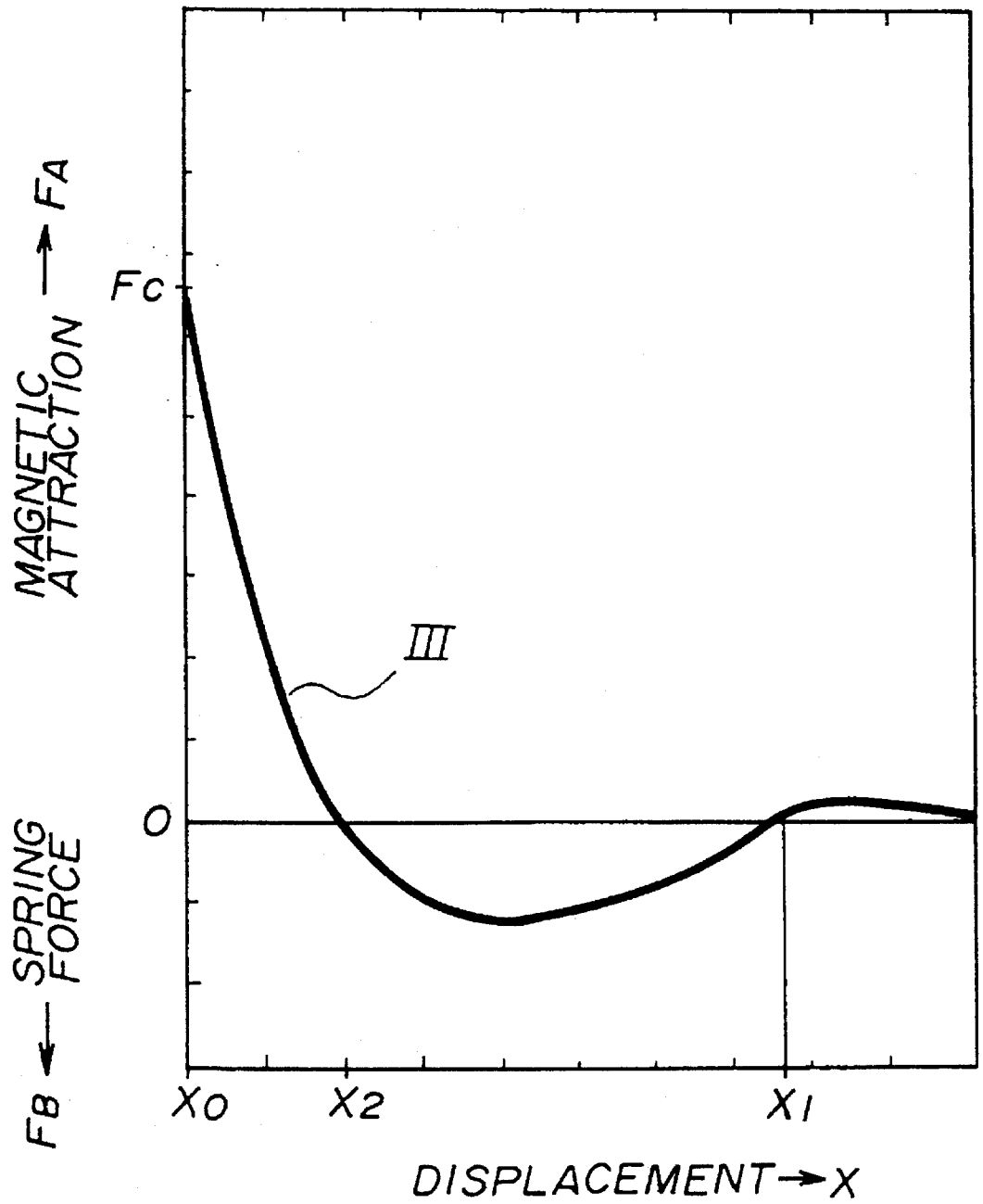
FIG. 4B is a graph showing the relationship between the position of the first yoke member and a force exerted on the first yoke member.

Referring to FIGS. 4A and 4B, the position X of the convex step portion 25a of the first yoke member 25 of FIG. 3B with respect to the position of the top of the second towering part 27b of the second yoke member 27 is plotted horizontally.

$X_1$ indicates the position of the convex step portion 25a of the first yoke member 25 when the magnetic head slider is in an unloaded state; $X_0$ indicates its position when the magnetic head slider is in a loaded position; and $X_2$ indicates a position near the position $X_0$.

$X_{1a}$ indicates the position of the convex step portion 25a when it is assumed that the permanent magnet piece 29 is not provided.

In FIG. 4A, the magnetic attraction $F_A$ exerted on the first yoke member 25 by the permanent magnet piece 29 is plotted vertically. In FIG. 4B, the spring force $F_B$ of the blade spring 26 is plotted vertically.

Referring to FIG. 3B, the magnetic attraction $F_A$ is exerted downward, and the spring force $F_B$ is exerted upward.

Referring to FIG. 4A, the line I shows how the spring force $F_B$ generated in the blade spring 26 varies as the position X is made to vary.

It will be noted that as the position is made to vary $(X_1 \rightarrow X_2 \rightarrow X_0)$, the spring force $F_B$ increases linearly.

The line II in FIG. 4A shows the magnetic attraction exerted on the first yoke member 25 by the permanent magnet piece 29 when the position X is made to vary.

It will be noted that as the position is made to vary $(X_1 \rightarrow X_2 \rightarrow X_0)$, the magnetic attraction $F_A$ shows an increase indicated by a quadratic curve.

Synthesizing the line I and the line II, we obtain the line III shown in FIG. 4B.

When the coil 28 is not energized, the first yoke member 25 is located at the position $X_1$, a magnetic attraction $F_{a1}$ and a spring force $F_{b1}$ being in balance.

It is assumed that, by exerting an external force, the first yoke member 25 is displaced from the position $X_1$ toward the position $X_0$.

The spring force $F_B$ then increases as indicated by the line I, and the magnetic attraction $F_A$ also increases as the line II indicates.

The relationship between the spring force $F_B$ and the magnetic attraction $F_A$ is such that, initially, the spring force $F_B$ is greater than the magnetic attraction $F_A$ ($|FB|>|FA_A|$).

As the first yoke member 25 is displaced toward $X_0$, the magnetic attraction $F_A$ increases sharply, and the difference between $|F_B|$ and $|F_A|$ becomes smaller until finally $|F_{a2}|=|F_{b2}|$.

At that moment, the convex step portion 25a of the first yoke member 25 is located at the position $X_2$ near the position $X_0$.

When the first yoke member 25 has passed the position $X_2$ and approaches the position $X_0$, the condition $|F_A|>|F_B|$ is induced.

To summarize the above, the relationship between the spring force $F_B$ and the magnetic attraction $F_A$ as the position X of the first yoke member 25 is made to vary is as shown below:

At the position $X_1$: $|F_A|=|F_B|$

In an interval R between the position $X_1$ and the position $X_2$: $|F_A|<|F_B|$ At the position $X_2$: $|F_A|=|F_B|$ In an interval S between the position $X_2$ and the position $X_0$, and at the position $X_0$: $|F_A|>|F_B|$ A description will now be given of the magnetic head slider loading/unloading operation.

1. Conditions that exist when the magnetic head slider is unloaded (FIG. 3B)

The coil 28 is not energized.

The first yoke member 25 is located at the position $X_1$.

The magnetic attraction $F_{a1}$ and the spring force $F_1$ are in balance.

The magnetic head slider 23a is located at a non-recording position (unloaded position) $H_1$, which position is higher than a surface 31a of the mounted magneto-optical disk 31.

2. Loading operation (FIG. 3A)

As described later, the coil 28 is temporarily energized by a predetermined dc current.

This causes the electromagnet 30 to be energized so that magnetic flux which has the same direction as the magnetic flux generated by the permanent magnet piece 29 is generated from the top of the towering part 27b of the second yoke member 27. That is, the electromagnet acts to enhance the magnetic force of the permanent magnet piece 29.

As a result of this, the magnetic attraction exerted on the first yoke member 25 becomes greater than the spring force $F_{b1}$ of the blade spring 26.

This causes the first yoke member 25 to be attracted, against the spring force of the blade spring 26, toward the towering position 27b to reach the position $X_0$ so that the convex step portion 25a rests above the depression 27d and is magnetically attracted to the rib parts 27e and 27f.

The magnetic head slider 23a is drawn near the rotating magneto-optical disk 31 so as to be floating at a recording position (loaded position) $H_2$ slightly above the surface 31a of the magneto-optical disk 31.

In this way, the loading of the magnetic head slider 23a above the magneto-optic disk 31 is completed, and the magnetic head assembly 23 is loaded.

When the first yoke member 25 has passed the position $X_2$ and has moved into the interval S, the coil 28 is de-energized.

When the coil 28 is de-energized, the electromagnet 30 is de-energized so that its function of enhancing the magnetic force of the permanent magnet piece 29 ceases to exist.

When the first yoke member 25 has moved into the interval S, the condition $|F_A|>|F_B|$ is induced.

As a result, after the first yoke member 25 has passed the position $X_2$, it is displaced only by the magnetic attraction $F_A$ generated by the permanent magnet piece 29.

When the first yoke member 25 is located at the position $X_0$, the condition $|F_A|>|F_B|$ is induced.

Hence, the permanent magnet piece 29 causes the first yoke member 25 to remain attached to the top of the rib parts 27e and 27f of the towering part 27b by a force $|F_A|-|F_B|(=F_C)$.

Subsequently, the magneto-optic disk apparatus 11 is put in a recording mode or a reproduction mode.

3. Unloading operation (FIG. 3B)

As described later, when the magnetic head assembly 23 is unloaded, the coil 28 is temporarily energized in a direction opposite the direction in which it is energized when the magnetic head assembly 23 is loaded.

This causes the electromagnet 30 to be energized so that the magnetic flux having the opposite direction in relation to the magnetic flux generated by the permanent magnet piece 29 is generated from the top of the towering part 27b of the second yoke member 27. That is, the electromagnet 30 acts to diminish the magnetic force generated by the permanent magnet piece 29.

Thus, the magnetic attraction exerted on the first yoke member 25 becomes smaller than the spring force $F_{b0}$ of the blade spring 26.

As a result of this, the first yoke member 25 is removed, against the magnetic attraction, from the rib parts 27e and 27f of the top of the towering part 27b by the spring force $F_B$ of the blade spring 26 so as to be displaced toward $X_1$.

The coil 28 is de-energized when the first yoke member 25 has passed the position $X_2$ and has moved into the interval R.

When the coil 28 is de-energized, the electromagnet 30 is de-energized, and the function of diminishing the magnetic force of the permanent magnet 29 ceases to exist.

When the first yoke member 25 moves into the interval R, the condition $|F_A|<|F_B|$ is induced.

Thus, after the first yoke member 25 has passed the position $X_2$, it is displaced toward $X_1$ by the spring force $F_B$ of the blade spring 26 without the magnetic force of the permanent magnet 29 being diminished by the electromagnet 30.

The first yoke member 25 is displaced to the position $X_1$ and is maintained at the position $X_1$, the magnetic attraction $F_{a1}$ and the spring force $F_{b1}$ being in balance.

The magnetic head slider 23a is moved from the recording position $H_2$ to the non-recording position $H_I$ so that the magnetic head assembly is in an unloaded state.

After the magnetic head assembly 23 is in an unloaded state, the magneto-optical disk 31 is removed. Thereafter, another magneto-optical 31 is mounted as required.

A description will now be given of how the energization of the coil 28 is controlled.

Figure 5:
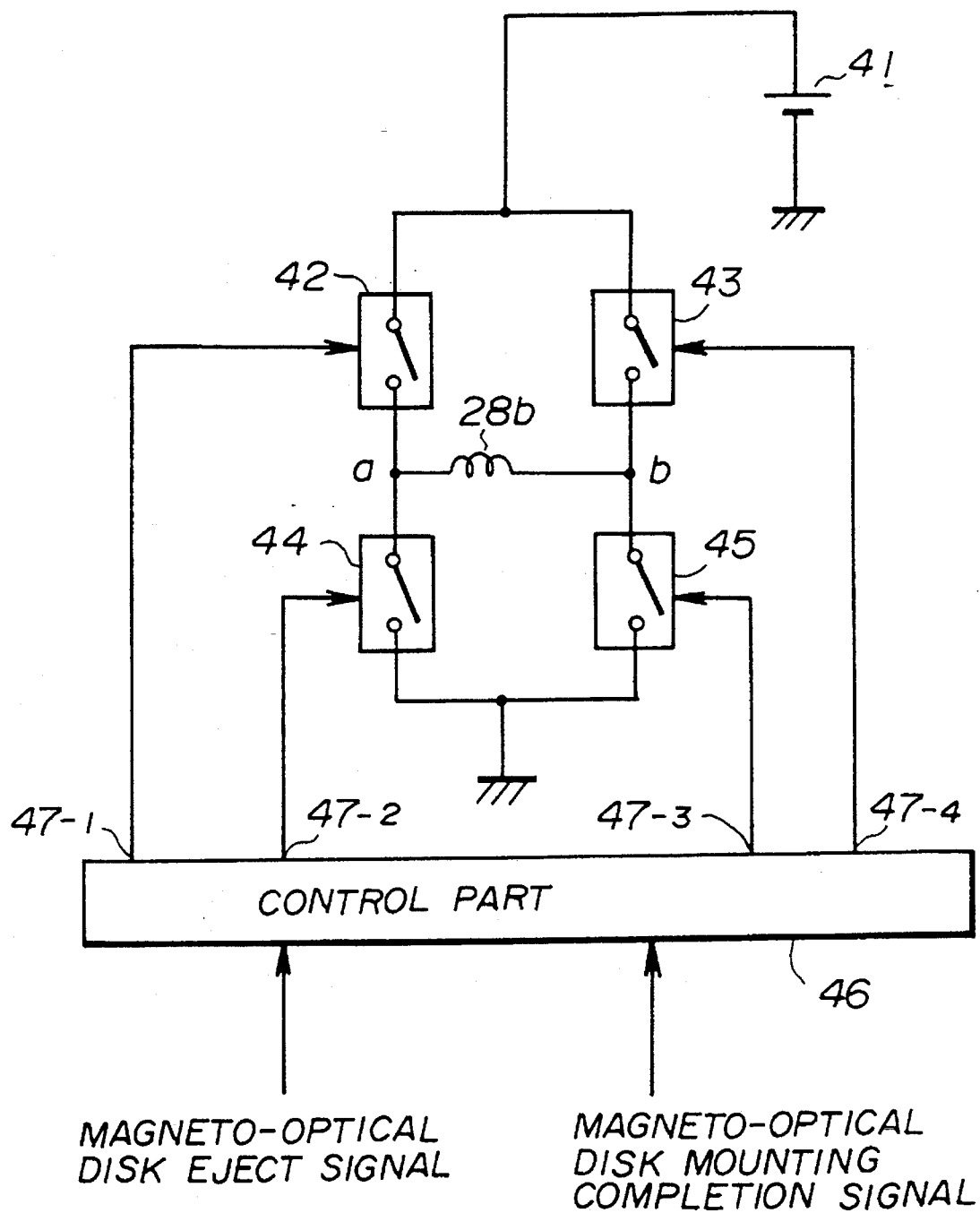
FIG. 5 is a block diagram of a circuit for controlling the energization of a coil.

FIG. 5 shows a control circuit for controlling the energization of the coil 28.

The control circuit includes: switch elements 42 and 44 that are in series connection and are normally open; switch elements 43 and 45 that are in series connection and are normally open; and a control part 46.

The coil 28 is connected to a point a that exists between the switch elements 42 and 44, and also to a point b that exists between the switch elements 43 and 45.

When the operator performs an eject operation, a magneto-optical disk eject signal is output and applied to the control part 46.

In response to this, the control part 46 outputs a switch closing signal for short period of time via output ports $47_{-1}$ and $47_{-3}$.

Accordingly, the switch elements 42 and the switch element 45 are temporarily closed so that a dc current generated by a dc current source 41 is allowed to flow through the coil 28 temporarily from the point a to the point b.

This causes the aforementioned unloading of the magnetic head assembly 23 to be effected.

When the operator operates the magneto-optical disk apparatus such that the magneto-optical disk 31 is mounted as shown in FIG. 3A, a magneto-optical disk mounting detecting part (not shown) outputs a magneto-optical disk mounting completion signal, which signal is applied to the control part 46.

This causes the control part 46 to output a switch closing signal via the output ports $47_{-2}$ and $47_{-4}$ for a short period of time.

Accordingly, the switch element 43 and the switch element 44 are temporarily closed so that a dc current generated by the dc current source 41 is allowed to flow through the coil 28 temporarily from the point b to the point a.

This causes the aforementioned loading of the magnetic head assembly 23 to be effected.

A description will be given below of features of the magnetic head assembly 23 and the magnetic head slider loading mechanism 24 of the above construction.

1. The magnetic head assembly 23 has a high rigidity.

Referring to FIG. 3A which shows the magnetic head slider in a loaded state, the first yoke member 25 is magnetically attracted by and fixed to the top of the towering part 27b of the second yoke member 27. Therefore, the end of the blade spring 26 is fixed with the result that the blade spring 26 is not included in the magnetic head assembly 23. In other words, the base of the support arm 23a is fixed.

Therefore, the magnetic head assembly 23 has a high rigidity.

The head carriage 19 shown in FIG. 1B is configured to be movable at a higher speed than the conventional head carriage.

Since the magnetic head assembly 23 has a high rigidity, the magnetic head slider 23a does not clash against the magneto-optical disk 31 and can be moved in a stable manner so as to effect a high-speed access to a desired track.

Since the magnetic head assembly 23 has a high rigidity, the magneto-optical disk 31 can be rotated at a higher speed than the conventional disk, without causing a problem.

2. Power consumption is low.

The coil 28 needs to be energized for only a short period of time. The energization of the coil 28 is unnecessary after the magnetic head slider 23a is loaded, or after the magnetic head slider 23a is unloaded.

That is, the coil 28 is not energized when the apparatus is in a recording mode or a reproducing mode. Further, the coil 28 is not energized when the magneto-optical disk is mounted or removed.

Hence, the power consumption of the magneto-optical disk apparatus 11 is relatively low.

3. The unloading or the loading of the magnetic heed slider can be performed at any time.

Both the permanent magnet piece 29 and the electromagnet 30 are provided on the head carriage 19.

Therefore, there is no need to return the head carriage 19 to a safety zone. That is, wherever the head carriage 19 is, the unloading or the loading of the magnetic head can be started immediately.

Accordingly, the time required for the magneto-optical disk to be removed after the magneto-optical disk eject operation is conducted is short so that an exchanging of the magneto-optical disk can be performed speedily.

4. The apparatus can be made thin.

Both the permanent magnet piece 29 and the electromagnet 30 are provided below the magnetic head assembly.

Hence, there is no member that projects upward from the magnetic head assembly 23.

Thus, the construction formed of the magnetic head assembly 23 and the magnetic head slider loading mechanism 24 is thin.

The present invention may also be constructed not to include the permanent magnet piece 29.

The present invention is not limited to the above described embodiment, and variations and modifications may be made without departing from the scope of the present invention.

What is claimed is:

1. A magneto-optical disk apparatus comprising:

a turntable on which a magneto-optical disk in a cartridge is mounted;

an optical head assembly;

a magnetic head assembly including a support arm, and a magnetic head slider at an end of said support arm which is provided with a magnetic head for generating a recording magnetic field:

a head carriage which supports said optical head assembly and said magnetic head assembly, and which moves in the radial direction of said magneto-optical dish in the cartridge; and a magnetic heard slider loading means for moving said magnetic head slider between a non-recording position removed from a surface of said magneto-optical disk in the cartridge and a recording position adjacent to said surface, wherein said magnetic head slider loading means comprises:

an elastic member fixed on said head carriage which supports, at an end of said elastic member, a base of said support arm of said magnetic head assembly, and supports said magnetic head slider at said non-recording position by a spring force; and a magnetic attraction means provided in said head carriage which elastically deforms said elastic member and magnetically attracts and fixes the base of said support arm when a recording is performed so that said magnetic head slider is fixed at said recording position, and wherein said magnetic attraction means is constructed of an electromagnet comprising a yoke member fitted to said head carriage, and a coil fixed to said yoke member which is energized when said magnetic head slider, located at said non-recording position, is moved to said recording position.

2. A magneto-optical disk apparatus comprising:

a turntable on which a magneto-optical disk in a cartridge is mounted;

an optical head assembly;

a magnetic head assembly including a support arm, and a magnetic head slider at an end of said support arm which is provided with a magnetic head for generating a recording magnetic field;

a head carriage which supports said optical head assembly and said magnetic head assembly, and which moves in the radial direction of said magneto-optical disk in the cartridge; and a magnetic head slider loading means for moving said magnetic head slider between a non-recording position removed from a surface of said magneto-optical disk in the cartridge and a recording position adjacent to said surface, wherein said magnetic head slider loading means comprises:

an elastic member fixed on said head carriage which supports, at an end of said elastic member, a base of said support arm of said magnetic head assembly, and supports said magnetic head slider at said non-recording position by a spring force; and a magnetic attraction means provided in said head carriage which elastically deforms said elastic member and magnetically attracts and fixes the base of said support arm when a recording is performed so that said magnetic-head slider is fixed at said recording position, and wherein said magnetic attraction means comprises:

a yoke member fitted to said head carriage;

a permanent magnet piece fixed to said yoke member;

a coil fixed to said yoke member; and means to energize said coil temporarily when said magnetic head slider, located at said non-recording position is moved to said recording position or when said magnetic head slider located at said recording position is moved to said non-recording position, and wherein magnetic force generated by said permanent magnet piece maintains said magnetic head slider at said recording position.

3. A magneto-optical disk apparatus comprising:

a turntable on which a magneto-optical disk in a cartridge is mounted;

an optical head assembly;

a magnetic head assembly including a support arm and a magnetic head slider which, provided at the end of said support arm, is provided with a magnetic head for generating a recording magnetic field;

a head carriage which supports said optical head assembly and said magnetic head assembly, and moves in the radial direction of said magneto-optical disk in a cartridge; and a magnetic head slider loading means for moving said magnetic head slider between a non-recording position reproved from the surface of said magneto-optical disk in a cartridge and a recording position adjacent to said surface, wherein said magnetic head slider loading means comprises:

a first yoke member fixed to the base of said support arm of said magnetic head assembly;

a generally U-shaped second yoke member having a first towering part and a second towering part, wherein said second towering part is fixed to said head carriage so as to be opposite said first yoke member;

a blade spring which, fixed to said first towering part, has said first yoke member fixed to the end of the blade spring, and which supports, by a spring force, said magnetic head slider at said non-recording position;

a coil fixed to said first towering part;

a permanent magnet fixed to said second towering part; and means to energize said coil temporarily when said magnetic head slider located at said non-recording position is moved to said recording position or when said magnetic head slider located at said recording position is moved to said non-recording position, wherein when the magnetic head slider has been moved to said recording position and said coil is de-energized magnetic force generated by said permanent magnet piece causes said first yoke member to remain attached to said first towering part so that the said magnetic head slider is maintained at said recording position.

4. A magneto-optical disk apparatus comprising:

a turntable on which a magneto-optical disk in a cartridge is mounted;

an optical head assembly;

a magnetic head assembly including a support arm, and a magnetic head slider at an end of said support arm which is provided with a magnetic head for generating a recording magnetic field;

a head carriage which supports said optical head assembly and said magnetic head assembly, and which moves in the radial direction of said magneto-optical disk in the cartridge; and a magnetic head slider loading means for moving said magnetic head slider between a non-recording position removed from a surface of said magneto-optical disk in the cartridge and a recording position adjacent to said surface, wherein said magnetic head slider loading means comprises:

a first yoke member fixed to a base of said support arm of said magnetic head assembly;

an elastic member fixed on said head carriage and having said first yoke member fixed at an end thereof and which supports said magnetic head slider at said non-recording position by a spring force; and a magnetic attraction means provided in said head carriage which deforms said elastic member and magnetically attracts and fixes said first yoke member in a recording mode so that said magnetic head slider is located at said recording position, and wherein said magnetic attraction means is constructed of an electromagnet comprising a second yoke member fitted to said head carriage, and a coil, which, fixed to said second yoke member, is energized when said magnetic head slider located at said non-recording position is moved to said recording position.

5. A magneto-optical disk apparatus comprising:

a turntable on which a magneto-optical disk in a cartridge is mounted;

an optical head assembly;

a magnetic head assembly including a support arm, and a magnetic head slider provided at the end of said support arm, which is provided with a magnetic head for generating a recording magnetic field;

a head carriage which supports said optical head assembly and said magnetic head assembly, and moves in the radial direction of said magneto-optical disk in the cartridge; and a magnetic head slider loading means for moving said magnetic head slider between a non-recording position removed from a surface of said magneto-optical disk in the cartridge and a recording position adjacent to said surface, wherein said magnetic head slider loading means comprises:

a first yoke member fixed to the base of said support arm of said magnetic head assembly;

an elastic member fixed on said head carriage which has said first yoke member fixed and an end, and which supports said magnetic head slider at said non-recording position by a spring force; and a magnetic attraction means provided in said head carriage which deforms said elastic member and which magnetically attracts and fixes said first yoke member in a recording mode so that said magnetic head slider is located at said recording position, wherein said magnetic attraction means comprises:

a second yoke member fitted to said head carriage;

a permanent magnet piece fixed to said second yoke member; and a coil fixed to said second yoke member;

means to energize said coil temporarily when said magnetic head slider located at said non-recording position is moved to said recording position or when said magnetic head slider located at said recording position is moved to said non-recording position, and wherein magnetic force generated by said permanent magnet piece maintains said magnetic head slider at said recording position.

6. A magneto-optical disk apparatus comprising:

a turntable on which a magneto-optical disk in a cartridge is mounted;

an optical head assembly;

a magnetic head assembly including a support arm and a magnetic head slider provided at an end of said support arm which is provided with a magnetic head for generating a recording magnetic field;

a head carriage which supports said optical head assembly and said magnetic head assembly, and moves in the radial direction of said magneto-optical disk in the cartridge; and a magnetic head slider loading means for moving said magnetic head slider between a non-recording position removed from a surface of said magneto-optical disk in the cartridge and a recording position adjacent to said surface, wherein said magnetic head slider loading means comprises:

a first yoke member fixed to a base of said support arm of said magnetic head assembly;

an elastic member fixed on said head carriage which supports, at the end of said elastic member, said first yoke member of said magnetic head assembly, said elastic member pressing said magnetic head slider toward said non-recording position by a spring force, and supporting said magnetic head slider at said non-recording position by a spring force; and a magnetic attraction means provided in said head carriage which elastically deforms said elastic member by magnetically attracting said first yoke member and magnetically attracts and fixes the base of said first yoke member when said magnetic head slider is adjacent said recording position, so that said magnetic head slider is fixed at said recording position.

7. The magneto-optical disk apparatus as claimed in claim 6, wherein said magnetic attraction means is a permanent magnet fixed to said head carriage.

8. The magneto-optical disk apparatus as claimed in claim 6, wherein said magnetic attraction means comprises:

a permanent magnet which magnetically attracts, when said magnetic head slider is adjacent said recording position, the first yoke member against a pressure of said elastic member so that said elastic member is elastically deformed; and an engagement part which is engaged with the first yoke member attracted by said permanent magnet so as to fix said support arm and to position said magnetic head slider at said recording position.

* * * * *